United States Patent [19]

Dabinett

[11] Patent Number: 5,144,907
[45] Date of Patent: Sep. 8, 1992

[54] SCALLOP AQUACULTURE

[76] Inventor: Patrick E. Dabinett, P.O. Box 254, Torbay, Newfoundland, Canada, A01 3Z0

[21] Appl. No.: 342,976

[22] Filed: Apr. 25, 1989

[30] Foreign Application Priority Data

Oct. 6, 1988 [CA] Canada .................................. 579526

[51] Int. Cl.$^5$ .............................................. A01K 61/00
[52] U.S. Cl. ........................................................ 119/4
[58] Field of Search ........................................ 119/4, 3

[56] References Cited

U.S. PATENT DOCUMENTS

| | | | |
|---|---|---|---|
| 1,660,259 | 2/1928 | Elsworth | 119/4 |
| 3,196,833 | 7/1965 | Glancy | 119/4 |
| 3,495,573 | 2/1970 | Vanderborgh, Jr. et al. | 119/4 |
| 4,080,930 | 3/1978 | Pruder et al. | 119/4 |
| 4,183,322 | 1/1980 | Shultz et al. | 119/4 |
| 4,257,351 | 3/1981 | Scura et al. | 119/4 |
| 4,532,883 | 8/1985 | Lockwood et al. | 119/4 |
| 4,844,015 | 7/1989 | Garvey et al. | 119/4 |

FOREIGN PATENT DOCUMENTS

| | | |
|---|---|---|
| 1112113 | 11/1981 | Canada . |
| 1132408 | 9/1982 | Canada . |
| 1136933 | 12/1982 | Canada . |
| 1083991 | 4/1984 | U.S.S.R. ........... 119/4 |

*Primary Examiner*—Paul J. Hirsch
*Assistant Examiner*—Todd E. Manahan
*Attorney, Agent, or Firm*—Eckert Seamans Cherin & Mellott

[57] ABSTRACT

A novel method is provided herein for the culturing of giant scallops from the egg stage to the juvenile stage. The method includes the following steps: firstly, obtaining and feeding native scallops. Secondly, inducing spawning in the scallop. Thirdly, selecting eggs surrounded by sperm in a preselected ratio of sperm/egg. Fourthly, hatching fertilized eggs at a preselected density in shallow dishes of water, thereby providing swimming larvae. Fifthly, removing the larvae after a preselected period of time, and re-suspending the larvae in deep larval tanks of sea water having food therein. Sixthly, periodically removing the larvae, re-suspending the removed larvae in larval tanks of the sea water and refeeding the re-suspended larvae with food in the sea water. Seventhly, after a period of time, allowing the larvae to settle on bottom of the larval tanks, in lighting conditions, and become spat while periodically changing the water in the tanks and feeding the larvae with food in the water in a larval tank. Eightly, after a period of time, brushing the spat out of the larval tank, catching the brushed-out spat on screen trays, and replacing the spat contained on such screen trays in a culturing tank of water on such screen trays being stacked vertically therein. Ninethly, periodically changing the water in the culturing tanks by inflow/outflow of water and monitoring food levels in the culturing tanks. Finally, after a preselected period of time, removing juvenile scallops from the culturing tanks.

19 Claims, No Drawings

SCALLOP AQUACULTURE

BACKGROUND OF THE INVENTION

1. Field of the Invention

This invention relates to a method for the breeding of bivalves (specifically giant scallops, Placopecten sp.).

2. Description of the Prior Art

The giant scallop (*Placopecten magellanicus*) has been identified as a promising aquaculture candidate species. The development of an aquaculture industry with scallops depends on a supply of "seed" or settling "spat" (i.e. young scallops leaving their pelagic larval stage to become benthic or bottom dwellers). Two potential supply lines exist, hatchery production and collection of wild seed. Until recently, hatchery production has not been successful at any meaningful scale, and collection of wild seed has been quite variable from year to year. The present status is that neither supply route has demonstrated the reliability necessary to sustain a culture industry.

Oysters, mussels, clams, scallops and the like are referred to as bivalves, and the commercial farming of such bivalves is referred to as bivalve culture. All bivalves have a similar life cycle. Initially, the bivalve larvae are free swimming ("planktonic"). After a time, the planktonic larvae develop into a stage capable of crawling referred to as pediveliger. Pediveligers which are capable of attaching to a substrate (referred to as "settling") are said to be competent. After setting on a substrate, (referred to as "cultch"), the larvae are allowed to develop and are finally harvested when they reach a suitable size.

Natural spawning of mature scallops results first in the development of the embryo. The embryo develops to the larvae stage, where larvae grow to the major stage of metamorphosis in their life cycle known as settlement. Larvae in this phase (30-40 days old) are free swimming or planktonic (spawn). At the settlement stage in their life cycle, planktonic larvae undergo a metamorphosis and develop into juvenile scallops (spat) which are essentially miniature adults. They measure approximately 0.5 mm in shell height. The spat then develop through the juvenile stage to the mature adult stage.

Breeding of giant scallop under controlled conditions and the consistent production of spat is highly desirable as a step towards aquaculture of this species. In the wild, the spawn settles widely on broad expanses of ocean bottom in waters from 10-100 m deep. Thus settling of the scallop spawn in the wild is impractical, often unpredictable.

For example, U.S. Pat. No. 3,196,833 patented Jul. 27, 1965 by J. B. Glancy purports to relate to a method of producing shellfish seed, e.g. the seed of oysters, clams, mussels, and scallops; in reality the patentee merely teaches a method for oyster "farming". Briefly, the method contemplates that natural oyster growing water, e.g. bay water, may be used during the production of oyster seed by controlling the toxicity of the water and by maintaining the water under conditions which provide for an adequate content of natural oyster food within the water itself. In order to accomplish this, the oyster seed production is carried on in tanks or other vessels located within the confines of a "greenhouse" type of solar radiation-admitting enclosure. The natural oyster growing water employed in the tanks in the greenhouse is treated by centrifuging to removing silt and the natural marine enemies of the oyster larvae without removing the relatively lighter natural oyster food, e.g. plankton, which is present in the water.

The process starts by collecting spawn from selected strains of oysters and fertilizing the eggs by the addition of sperm in accordance with known techniques. After fertilization, when the oyster embryos or larvae begin to swim, they are transferred to larval tanks wherein the swimming larvae are cultivated until they reach settling size. During the larval period, the treated water in the tanks is changed daily, or more often, to provide the necessary supply of food for the larvae and to minimize the toxic level of the water. When the larvae grow to a settling size, they are ready for settling and are transferred to settling tanks located within the greenhouse. Mesh bags filled with cultch, e.g. bare mollusc shells, are placed in the settling tanks with the larvae and the tanks supplied with treated water, so that the larvae attach themselves to the cultch where they become known as "set" or "spat". When the setting concentration reaches a suitable level, the cultch with attached oyster set is taken from the setting tanks and transferred to a protected area of the natural oyster growing grounds. Since the oyster set are still of a relatively small size, the bags of cultch are suspended from floats or other support devices in the protected area of the oyster growing grounds to protect the spat from natural marine enemies and adverse water conditions. Finally, when the suspended spat or set reach a larger size, they are removed from the suspension devices and the cultch shells are then spread on the natural oyster growing grounds for cultivation to market size in accordance with known techniques.

The invention also teaches the resetting of oyster set which have set on the inner surfaces or walls of the setting tanks rather than on the cultch material. This is accomplished by brushing the walls of the setting tanks to remove the set and then recovering the removed set by means of screening. The brushed-off oyster set is then sprinkled at a desired concentration on cultch material in resetting tanks, where the set resets itself within a period of about four days. The cultch having the reset spat is then transferred to the protected area of the natural growing grounds in the same manner as the cultch from the setting tanks.

U.S. Pat. No. 4,080,930 patented Mar. 28, 1978 by G. D. Pruder et al provided a method for rearing commercially desirable bivalve molluscs, e.g. oysters, clams, mussels, and scallops under artificial conditions to any marketable size in substantially reduced time periods. In practice, however, the patent is related to the rearing of oysters. Oyster spat produced by known means are placed in growing tanks and fed at certain regular times with certain species of algae in unusually large quantities, at unusually high algae cell concentrations, and maintained at unusually high temperatures until oysters reach the desired size. The tanks and oysters are meticulously cleansed and seawater or other source of salts and minerals is added at regular times during the rearing period.

Canadian Patent 1,112,113 patented Nov. 10, 1981 by J. B. Marliave provided an apparatus for the field rearing of planktonic larval forms of marine animals involving the suspension of a field culture chamber in oceanic tidal waters. The chamber was provided with an entry port in its side for adjustably admitting tidal flow water, a means for deflecting water around the chamber periphery, and an exit port in the chamber bottom to permit the outflow of water from the chamber. A curtain was suspended over the interior openings of the entry vanes to prevent the exit of larvae through the entry port. The interior of the chamber was stocked with larvae of a preselected species of marine animal. The chamber was oriented in response to the tidal flow of water so that the water flowed into the chamber through the entry port. Prior to entering the chamber, the water was screened to prevent admittance of plankton of greater than a predetermined size and to permit admittance of plankton small enough to be utilized as food by the larvae of the preselected species. Water flowing out of the chamber through the exit port was filtered to prevent the escape of larvae and food plankton.

Canadian Patent 1,132,408 patented Sep. 28, 1982 by G. S. Lockwood et al provided a process of culturing gastropod molluscs and other benthic motile marine and aquatic animals from the larval stage through infancy in a body of water in a growing tank having therein settlement surfaces upon which the larvae settle and in which the animals resulting from larvae metamorphosis live. The process included conditioning the settlement surfaces to develop thereon a microbiological community so as to induce settlement of larvae and to support life thereon; then introducing larvae of the animal into the tank whereby at least a portion of the larvae will settle upon the settlement surfaces and undergo metamorphosis and subsequent growth; then circulating water in the tank at least periodically; and finally controlling the biological and chemical balance in the tank to provide food and to limit the build-up of harmful components and conditions in the tank.

Canadian Patent 1,136,933 patented Dec. 7, 1982 by P. C. Brinkworth provided a method of cultivating marine and aquatic species. The species were housed in habitats in which they remained for the major part of their growth cycle, such habitats being located within a body of water. Clean water from an external source was passed through at least one restricted passage means into each habitat to provide a compatible zone within each habitat for the specie contained therein. Water from that restricted passage means flowed past the species in laminar flow condition to an incompatible zone external to each habitat. Each adjacent wall of each habitat was formed of imperforate material so that the species contained within each habitat was isolated from each other and so that cross-contamination cannot take place.

U.S. Pat. No. 4,198,926 patented Apr. 12, 1988 by D. E. Morse provided a method to induce and control spawning and reproduction in shellfish in seawater, which comprised adding, to the seawater, an oxidizing agent which yields activated oxygen, particularly hydrogen peroxide. The patent found that the addition of low concentrations of such oxidizing agent, particularly hydrogen peroxide, to alkaline seawater will cause synchronous spawning of gravid male and female species of shellfish, e.g. abalones, mussels, scallops and oysters.

U.S. Pat. No. 4,348,983 patented Sep. 14, 1982 by K. L. Cooper provided a method for inducing the setting of planktonic bivalves onto a substrate is disclosed. Planktonic bivalves which have reached the competent pediveliger stage, are exposed to certain 1-substituted-3,4-dihydroxylbenzenes, e.g. 3,4-dihydroxyphenylalanine at a sufficient minimum concentration.

U.S. Pat. No. 3,996,895 patented Dec. 14, 1976 by J. C. Wiegardt, Jr. provided a system for the artificial growing of dense populations of hatchery-derived filter-feeding shellfish, e.g. free oysters and clams, with means provided for holding these populations in currents of nutrient-laden water. These means involved a flume system for growing the seed from hatchery sizes to intermediate sizes, with a special case for growing hardshell clams toward maturity in a flume, or "spillway" system. As the seed grew toward maturity, their requirements for current and for nutrients increased. In the patented system, a progression of structures was utilized, beginning with a basic raft structure and adding channelling extensions to this primary structure. Each addition to the primary structure was designed to increase the efficiency of the system in utilizing a basic current and phytoplankton resource. The system was capable of taking tiny hatchery-derived seed and growing them to commercial maturity in a series of stages designed to optimize handling and feeding requirements at the various stages. At the stages where the organisms approached commercial maturity and required current flow and more nutrients, the system was capable of developing an increased level of efficiency in regard to the utilization of resources of current flow and nutrients. At its most efficient level, the system contemplates harvest of a phytoplankton resource of any esturial area at optimum sustainable levels.

SUMMARY OF THE INVENTION

Aims of the Invention

Despite these patented improvement solutions to the aquaculture of shellfish, need still exists for giant scallop aquaculture. The expansion of the bivalve culture industry has been limited by the lack of an effective method of replacing population lost through harvest and mortality with new larvae. In part, this is due to an inability to induce competent pediveligers to set on a cultch in an artificially maintained setting tank.

Accordingly, it is a principal object of this invention to provide a practical method of producing seed of giant scallop which method is relatively simple to practice and which insures the production of a steady output of seed of suitable quality and size.

It is a further object of this invention to provide a method of producing seed of giant scallop which method permits the economical production of selected, fast growing, high yielding or disease-resistant strains of seed giant scallop in large, commercially-viable numbers.

Another object of this invention is to provide a reliable consistent seed supply to restock overfished or naturally depleted scallop beds.

Yet another object of this invention is to provide a method for the culturing of giant scallops while maintaining proper sanitation conditions within culture chambers without the requirement for unacceptably large amounts of time and labour (which make them impracticable for commercial use).

A further object of this invention is to provide a method for the improved culture of giant scallop by providing, to the growing scallop, uniform equilibrium condition with respect to: temperature; rate of feed; and rate of waste removal.

Still another object of this invention is to provide a novel and inexpensive, easily controlled method for inducing spawning and reproduction in giant scallop.

Statements of Invention

By this invention, a method is provided for culturing giant scallops from the egg stage to the juvenile stage under controlled conditions comprising the steps of: (a) obtaining and feeding native scallops; (b) inducing spawning in the scallop; (c) selecting eggs surrounded by sperm in a preselected ratio of sperm/egg; (d) hatching fertilized eggs at a preselected density in shallow dishes of water, thereby providing swimming larvae; (e) removing the larvae after a preselected period of time, and re-suspending the larvae in deep larval tanks of selected sea water having selected food therein; (f) periodically removing the larvae, re-suspending the removed larvae at a preselected density in larval tanks of the selected sea water and refeeding the resuspended larvae with selected food in the sea water; (g) after a preselected period of time, allowing the larvae to settle on bottom of the larval tanks in preselected lighting conditions and become spat, while periodically changing the water in the larval tanks and feeding the larvae with food in the water in a larval tanks; (h) after a preselected period of time, brushing the spat out of the larval tank, catching the brushed-out spat on screen trays, and replacing the spat contained on the screen trays in a culturing tanks of selected water on such screen trays being stacked vertically therein; (i) periodically changing the water in the tanks by inflow/outflow of water and monitoring food levels in the culturing tanks; and (j) after a preselected period of time, removing juvenile scallops from the culturing tanks.

This invention also provides an improvement in a method of culturing giant scallops from the egg stage to the juvenile stage under controlled conditions, involving, as essential steps: after a preselected period of time of growing larvae in deep larval tanks, allowing the larvae to settle on bottom of the larval tanks in preselected lighting conditions and become spat, while periodically changing the water in the larval tanks and feeding the larvae with food in the water in a spawning tank; after a preselected period of time, brushing the spat out of the larval tanks, catching the brushed-out spat on screen trays, and replacing the spat contained on the screen trays in a culturing tank of selected water on such screen trays being stacked vertically therein; and periodically changing the water in the culturing tanks by inflow/outflow of water and monitoring food levels in the culturing tanks.

This invention also provides an improvement in a method of culturing giant scallops from the egg stage to the juvenile stage under controlled conditions, involving, as essential steps: removing the larvae of said scallops from shallow dishes of water after a preselected period of time, and re-suspending the larvae in deep larval tanks of selected sea water having selected food therein; periodically removing the larvae therefrom, re-suspending the removed larvae at a preselected density in larval tanks of the selected sea water and re-feeding the re-suspended larvae with selected food in the sea water; after a preselected period of time, allowing the larvae to settle on bottom of the larval tanks in preselected lighting conditions and become spat, while periodically changing the water in the tanks and feeding the larvae with food in the water; after a preselected period of time, brushing the spat out of the larval tanks, catching the brushed-out spat on screen trays, and replacing the spat contained on the screen trays in a culturing tanks of selected water on such screen trays stacked being vertically therein; and periodically changing the water in the tank by inflow/outflow of water and monitoring food levels in the culturing tanks.

This invention also provides an improvement in a method for culturing giant scallops from the egg stage to the juvenile stage under controlled conditions involving feeding scallop larvae with food in the water in which the scallop larvae are growing, the improvement comprising using, as the food, a mixture of cultured phytoplankton comprising: *Isochrysis galbana, Isochrysis galbana* var. Tiso, *Thallassiosira pseudonana*, and *Chaetoceros gracilis.*

Further Features of the Invention

By features of this invention, spawning is induced by means of a jet of sea water, or by means of the hormone serotonin, or by changing the temperature of the water.

By another feature of this invention, the scallop eggs selected for hatching are surrounded by sperm at a ratio of about 6 sperm/egg, especially where the fertilized scallop eggs are allowed to hatch in about 1-2 cm of water at a density of about 100 eggs/cm$^2$, or where the fertilized eggs hatch in the presence of neomycin sulfate at a temperature of about 15° C. in 3 days.

By yet another feature of this invention, the larvae are removed on sieves or plankton mesh nets and are re-suspended in tanks at a density of about 2 larvae/ml, by screening 3 times/week and are re-suspended in the same size tanks in clean sea water.

By still another feature of this invention, the larvae are fed with food comprising a mixture of cultured phytoplankton comprising: *Isochrysis galbana*, Isochrysis sp. (clone T. Iso), [formerly known as *Isochrysis galbana* var. Tiso], *Thallasiosira pseudonana*, and *Chaetocaros muelleri* [formerly known as *Chaetoceros gracilis*].

By a further feature of this invention, after about 30 days, when the larvae commence settling in the larval tanks, the step of changing the water containing scallop food therein, through screens to allow the spat to remain and settle in the bottom of the tank, and especially wherein, after about two weeks the spat are brushed off the tank and are caught on submerged nylon mesh nets.

By a still further feature of this invention, the water in the culturing tanks where the scallops are grown on stacked trays of nylon mesh screen is changed 3 times/week.

The juvenile scallops are removed after they have grown for about 3-4 weeks.

The improvement provided herein for the method for culturing giant scallops from the egg stage to the juvenile stage under controlled conditions involves feeding scallop larvae with food in the water in which the scallop larvae are growing, which comprises: using, as the food, a mixture of cultured phytoplankton comprising: *Isochrysis galbana*, Isochrysis sp. (clone T. Iso), [formerly known as *Isochrysis galbana* var. Tiso], *Thallasiosira pseudonana*, and *Chaetocaros muelleri* [formerly known as *Chaetoceros gracilis*].

EXAMPLES OF PREFERRED EMBODIMENTS

By the present invention, technology has been developed which has successfully bred the giant scallop (*Placopecten magellanicus*) in the controlled environment of a laboratory. The following is a description of one complete process for such aquaculture:

Mature scallops are first obtained and fed. Spawning is then induced by one of the following well-known prior art techniques, namely: under a jet of sea water about 20 l/min, or by raising or lowering temperature of the water, or by use of the hormone serotonin. (An effective control of scallop spawning by injecting serotonin creatinine sulphate into adductor muscle of mollusc is taught in Swiss Patent No. 214,040-A. The patentee teaches that, in order to accelerate sex cell production and to control more effectively the spawning period, the adductor muscle of the mollusc is injected with about 1–4 ml of a 0.03 percent serotonin creatinine sulphate solution. The water temperature is maintained at a value necessary for spawning.) The eggs are counted and removed in a graduated cylinder. Sperm is then injected and the eggs are then inspected under microscope in suspension. The sperm-to-egg ratio is adjusted to approximately 6 sperm/egg. The fertilized eggs are left in shallow dishes at densities of approximately 100 eggs/cm$^2$ in a depth of about 1–2 cm of water @ about 15° C. for 3 days. It is preferred to adopt the well-known, prior art technique of adding the antibiotic neomycin sulfate @ about 50 ug/ml.

During that time, the eggs become swimming larvae. The larvae are then removed on sieves or plankton mesh nets. The removed larvae are re-suspended in larval tanks @ about 2 larvae/ml. The larvae are removed 3 times/week by screening and are re-suspended in clean larval tanks. The larvae are re-fed using the food described later.

After about 30 days of growing the larvae commence settlement. Thereafter the water is changed through a screen but the larvae remain and settle on the bottom of the larval tanks. This growing stage continues for about 2 weeks. Then the spat are brushed out of the larval tanks, and are caught on submerged screens, e.g. made of nylon. The spat are then replaced in culturing tanks on trays of nylon mesh screen, stacked vertically. Water is changed by inflow/outflow, thrice/week. The food levels are monitored daily. After about 3–4 weeks juvenile scallops are removed, and the culturing tank are cleaned. The juvenile scallops are then re-suspended on screen stacks up to 1.5 m mesh screen trap, the tray being stacked in the culturing tanks.

The present invention also used a standard prior art sea water treatment. In such treatment the sea water is filtered to remove particles to about 1 micron in size (using, e.g. Gelman filters). The filtered sea water is then passed through a UV sterilizer system (e.g. as is supplied by Trojan Electronics). The sea water is maintained at about 15° C., either by heating or cooling. The sea water is oxygenated by compressed and filtered air into the inflow sea water to remove supersaturated water, thereby producing air bubbles on heating.

The present invention also provides a novel method for the production of food for feeding giant scallops. In this procedure, phytoplankton is cultured. Four species which are commercially available as "laboratory weeds" and which are useful in this invention are *Isochrysis galbana*, Isochrysis sp. (clone T. Iso), [formerly known as *Isochrysis galbana* var. Tiso], *Thallasiosira pseudonana*, and *Chaetocaros muelleri* [formerly known as *Chaetoceros gracilis*]. The food is fed at a ratio of:

8 parts—*Isochrysis galbana*,
8 parts—*Isochrysis galbana* var. Tiso,
4 parts—*Thallassiosira pseudonana*, and
4 parts—*Chaetoceros gracilis* (cells/microlitre=24,000 cells/ml)

The feeding is monitored and more plankton is added to maintain food level as larvae filter out phytoplankton.

Nutrient enrichment medium "F/2" is used to grow Isochrysis sp. Nutrient enrichment medium F/2+silicate is used to grow *Thallassiorsira p.* & *Chaetoceros g.* The plankton is grown under continuous light from daylight and cool white fluorescent tubes, in Erlenmeyer flasks with bubbled air.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be within the full range of equivalence of the following claims.

What I claim is:

1. A method for culturing giant scallops from the egg stage to the juvenile stage under controlled conditions comprising the steps of: (a) obtaining and feeding native scallops; (b) inducing spawning in said scallops; (c) selecting eggs surrounded by sperm in a preselected ratio of sperm/egg; (d) hatching fertilized eggs at a preselected density in shallow dishes of water, thereby providing swimming larvae; (e) removing said larvae after a preselected period of time, and resuspending said larvae in deep larval tanks of selected sea water having selected food therein; (f) periodically removing said larvae, resuspending said removed larvae at a preselected density in larval tanks of the selected sea water and re-feeding said resuspended larvae with selected artifically-grown algae food in the sea water; (g) after a preselected period of time, allowing said larvae to settle on the bottom of said larval tanks in selected lighting conditions, and become spat, while periodically changing the water in said larval tanks and feeding said larvae with artifically-grown algae food provided in the water in said larval tanks; (h) after a preselected period of time, brushing said spat out of said larval tanks, catching said brushed-out spat on screen trays, and replacing said spat contained on said screen trays in a culturing tank of selected water, said screen trays being stacked vertically therein; (i) periodically changing the water in said culturing tank by inflow/outflow of water and monitoring food levels in said culturing tank; and (j) after a preselected period of time, removing juvenile scallops from said culturing tank.

2. The method of culturing giant scallops from the egg stage to the juvenile stage under controlled conditions as claimed in claim 1, including using, as said water, sea water which has been: (a) filtered to remove particles smaller than about 1μ in size; (b) passed through a UV sterilization system; (c) maintained at a temperature of about 15° C.; and (d) oxygenating by bubbling filtered air into said sea water.

3. The method of claim 1 wherein spawning is induced by means of a jet of sea water.

4. The method of claim 1 wherein spawning is induced by means of the hormone serotonin.

5. The method of claim 1 wherein spawning is induced by changing the temperature of the water.

6. The method of claim 1 wherein said scallop eggs selected for hatching are surrounded by sperm at a ratio of about 6 sperm/egg.

7. The method of claim 1 wherein said fertilized scallop eggs are allowed to hatch in about 1-2 cm of water at a density of about 100 eggs/cm$^2$.

8. The method of claim 7 wherein said fertilized eggs hatch in the presence of neomycin sulfate at a temperature of about 15° C. in 3 days.

9. The method of claim 1 wherein swimming larvae are removed on sieves or mesh nets and are resuspended in 300 L. tanks at a density of about 2 larvae/ml.

10. The method of claim 9 wherein said larvae are removed by screening 3 times/week and are re-suspended in the same size tanks in clean sea water.

11. The method of claim 10 wherein the larvae are fed with food comprising a mixture of cultured phytoplankton comprising: *Isochrysis galbana, Isochrysis galbana* var. Tiso, *Thallassiosira pseudonana*, and *Chaetoceros gracilis.*

12. The method of claim 1 wherein, after about 30 days, when the larvae commence settling in the larval tanks, the step of changing the water containing scallop food therein, through screens to allow the spat to remain and settle in the bottom of the tank.

13. The method of claim 12 wherein, after about 2 weeks said spat are brushed off the tank and are caught on submerged nylon mesh nets.

14. The method of claim 1 wherein the water in said culturing tank where the scallops are grown on stacked trays of nylon mesh screen is changed 3 times/week.

15. The method of claim 14 wherein juvenile scallops are removed after they have grown for about 3-4 weeks.

16. An improvement in a method of culturing giant scallops from the egg stage to the juvenile stage under controlled conditions, involving as essential steps: (1) removing the larvae of said scallops from shallow dishes of water after a preselected period of time, by screening on sieves or plankton mesh nets as water is substantially removed from said shallow dishes; (2) adding selected clean sea water to deep larval tanks and transferring said captured larvae to said deep larval tanks, thereby re-suspending said larvae at about 2 larvae/ml; (3) feeding said larvae with artificially-cultured phytoplankton food, said food being provided in said selected sea water; (4) periodically removing said larvae by screening on sieves or plankton mesh nets as water is substantially-completely removed from said deep larval tanks and re-suspending said removed larvae at about 2 larvae/ml by adding selected clean sea water to deep larval tanks and transferring said captured larvae to said deep larval tanks; (5) feeding said larvae with artificially-cultured phytoplankton food, said food being provided in said selected sea water; and (6) periodically, about 3 times/week repeating steps (4) and (5) until said larvae commence settling.

17. An improvement in a method of culturing giant scallops from the egg stage to the juvenile stage under controlled conditions, involving as essential steps: after a preselected period of time of growing larvae in deep larval tanks, allowing said larvae to settle on a flat surface of said larval tanks in selected lighting conditions and become spat, while periodically changing the water in said tank and feeding said larvae with artificially-grown algae food provided in the water in said larval tanks; after a preselected period of time, brushing said spat out of said larval tanks; catching said brushed-out spat on screen trays; replacing said spat contained on said screen trays in a culturing tank of selected water, on said screen trays being stacked vertically therein; and periodically changing the water in said culturing tank by inflow/outflow of water and monitoring food levels in said culturing tank.

18. An improvement in a method of culturing giant scallops from the egg stage to the juvenile stage under controlled conditions, involving as essential steps: removing larvae of said scallops from shallow dishes of water after a preselected period of time, and resuspending said larvae in deep larval tanks of selected sea water having selected artificially-grown larvae food therein; periodically removing said larvae; resuspending said removed larvae at a preselected density in larval tanks of the selected sea water; re-feeding said resuspended larvae with selected artificially-grown larvae food provided in the sea water; after a preselected period of time of growing said larvae in deep larval tanks, allowing said larvae to settle on the bottom of said larval tanks in selected lighting conditions and become spat, while periodically changing the water in said tanks and feeding said larvae with food in the water in said larval tanks; after a preselected period of time, brushing said spat out of said larval tanks; catching said brushed-out spat on screen trays; replacing said spat on said screen trays in a culturing tank of selected water, on said screen trays being stacked vertically therein; and periodically changing the water in said tank by inflow/outflow of water and monitoring artificially-grown larval food levels in the culture.

19. An improvement in a method for culturing giant scallops under controlled conditions involving feeding scallop larvae with artificially-grown larval food in the water in which the scallop larvae are growing, the improvement comprising: using, as the artificially-grown larval food, a mixture of cultured phytoplankton comprising: *Isochrysis galbana*, Isochrysis sp. (clone T.Iso), *Thallassiosira pseudonana*, and *Chaetocaros muelleri.*

* * * * *